United States Patent Office 3,547,954
Patented Dec. 15, 1970

3,547,954
1-SUBSTITUTED 3-ARYLSULFONYL UREAS
Henri Dietrich, Arlesheim, Basel-Land, Switzerland, assignor to Geigy Chemical Corporation, Ardsley, N.Y., a corporation of New York
No Drawing. Filed May 6, 1968, Ser. No. 727,043
Claims priority, application Switzerland, May 12, 1967, 6,796/67
Int. Cl. C07d 7/04
U.S. Cl. 260—345.7                 6 Claims

ABSTRACT OF THE DISCLOSURE 1-(substituted-phenylsulfonyl) - 3 - (2-oxa-adamant-1-yl)-ureas and pharmaceutically acceptable salts thereof with bases are prepared; pharmaceutical compositions containing said compounds and methods of producing a hypoglycemic effect in mammals are provided.

DETAILED DISCLOSURE

The present invention concerns new 1-substituted 3-aryl-sulfonyl ureas, processes for the production thereof, pharmaceutical preparations which contain the new compounds and their use as medicaments.

In particular the present invention pertains to compounds of Formula I

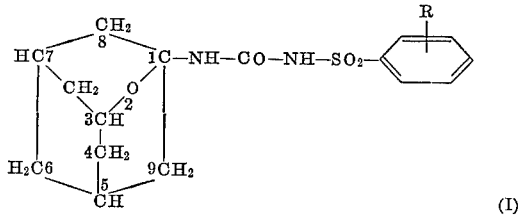

wherein

R is hydrogen, fluoro, chloro, bromo, (lower)alkyl, (lower)alkoxy, (lower)alkylthio, (lower) alkanoyl or amino and pharmaceutically acceptable salts with bases thereof.

It has been found that the new compounds and their pharmaceutically acceptable salts have valuable pharmacological properties. In particular, they have a hypoglycemic action on oral or parenteral administration which characterises them as suitable for the treatment of diabetes.

In the compounds of general Formula I, R can be in the o-, m- or p-position.

By the term "(lower)alkyl" and derivations thereof utilizing the root "alk," such as "(lower)alkoxy," and "(lower)alkanoyl," is intended a group comprising a straight or branched hydrocarbon chain containing from one to six carbon atoms. Representative of (lower)alkyl groups are thus methyl, ethyl, propyl, isopropyl, butyl, isobutyl, sec. butyl, tert. butyl, pentyl, isopentyl, 2,2-dimethyl-propyl, hexyl and the like. Embraced by (lower)alkoxy are groups containing from one to six carbon atoms and joined through an oxygen ether bond such as methoxy, ethoxy, propoxy, isopropoxy, butoxy, isobutoxy, sec. butoxy, tert. butoxy, pentoxy, isopentoxy, 2,2-dimethyl-propoxy and the like. Embraced by (lower)alkylthio are groups joined through a thio ether bond such as methylthio, ethylthio, propylthio, isopropylthio, butylthio, isobutylthio, sec. butylthio, tert. butylthio, pentylthio, isopentylthio, 2,2-dimethyl-propylthio and the like. Embraced by (lower)alkanoyl are groups containing from one to seven carbon atoms such as acetyl, propionyl, 2-methyl-propionyl, butanoyl, 2-methyl-butanoyl, 3-methyl-butanoyl, pentanoyl, hexanoyl and the like.

The compounds of Formula I are produced according to the invention by reacting an isocyanate or isothiocyanate derivative of the Formula II

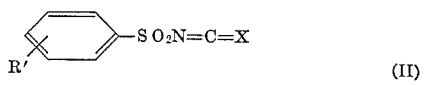

wherein

R' has the meaning of R or it represents a group which can be converted by hydrolysis or reduction into the amino group, and
X represents oxygen or sulfur, or by reacting a reactive functional derivatives of a carbamic or thiocarbamic acid of the Formula III

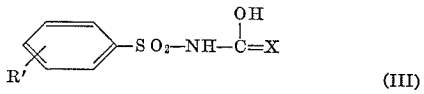

wherein X and R' have the meanings given in Formula II, with 1-amino-2-oxa-adamantane or with an alkali metal derivative thereof, converting a thiourea derivative obtained into a urea derivative, if necessary, hydrolysing or reducing the reaction product obtained to convert the group R' into the free amino group and, if desired, converting the reaction product of Formula I obtained into a pharmaceutically acceptable salt with a base.

As reactive functional derivatives of carbamic or thiocarbamic acids of Formula III are intended, for example, their halides, particularly the chlorides (lower)alkyl ester, in particular the methyl or ethyl ester, phenyl esters, amides, (lower)alkylamides, dialkylamides, such as N-methylamides and N,N-dimethylamides, diphenylamides, N-acylamides such as acetylamides, benzoylamides and phenylsulfonylamides.

Examples of such functional derivatives of acids of Formula III are: N-phenylsulfonyl carbamic acid chloride, N-phenylsulfonyl carbamic acid methyl, ethyl and phenyl ester, phenylsulfonyl urea, 1-methyl-3-phenylsulfonyl urea, 1,1-dimethyl-3-phenylsulfonyl urea, 1,1-diphenyl-3-phenylsulfonyl urea, 1-acetyl-3-phenylsulfonyl urea, 1-benzoyl-3-phenylsulfonyl urea, 1,3-bis-phenylsulfonyl urea, N-phenylsulfonyl-2-oxo-pyrrolidine-1-carboxamide, N-phenyl-sulfonyl - 2-oxo - piperidine-1-carboxamide, N-phenylsulfonyl-2-oxo-hexahydro - 1H-azepine-1-carboxamide or analogous compound the phenylsulfonyl group or groups of which contain the substituent R' as defined following Formula II. In cases in which R' is fluoro, chloro, bromo, loweralkyl, alkoxy, alkylthio or alkanoyl, these groups are identical with the groups of the same type which are listed for R following Formula I. Examples of groups R' which can be converted into the amino group are given below.

Starting materials of Formulae II and III are well known in the art and are prepared by methods well known in the art. Substituted phenyl sulfonylisocyanates are for example described by H. Ulrich, Chem. Rev. 65, 369 (1965) and H. Ulrich, Angew. Chem. 78, 761 (1966). The isothiocyanate compounds are described by K. Dickore et al. in Angew. Chem. 77, 429 (1965). Functional derivatives of carbamic acids and thiocarbamic acids of Formula III are described, for example, by F. Kurzer, Chem. Rev. 50, 1 (1952) as well as in German Pat. No. 845,042 and W. Reppe, Ann. 596, 1 (1955).

The reaction is performed, e.g. at low or at elevated temperature, preferably in an inert organic solvent. Suitable inert organic solvents are, e.g. hydrocarbons such as benezene, toluene or xylene, ether-type liquids such as ether, dioxane or tetrahydrofuran, chlorinated hydrocarbons such as methylene chloride, or lower ketones such as acetone or methylethyl ketone.

The reaction of an isocyanate, isothiocyanate, carbamic acid ester, thiocarbamic acid ester, urea or thiourea can also be performed without solvents or diluents. In general no condensing agent is necessary; if desired, however, e.g. an alkali alcoholate or tertiary organic bases can be used as such agents. Isocyanates or isothiocyanates, however, can also be used, e.g. in the form of an addition product with a tertiary organic base.

A carbamic acid halide or thiocarbamic acid halide is reacted according to the invention with 1-amino-2-oxa-adamantan preferably in the presence of an acid binding agent. As such, e.g. inorganic bases or salts such as an alkali hydroxide, acetate, hydrogen carbonate, carbonate and phosphate, such as sodium hydroxide, sodium acetate, sodium hydrogen carbonate, sodium carbonate and sodium phosphate or the corresponding potassium compounds, are used. In addition, calcium oxide, calcium carbonate, calcium phosphate and magnesium carbonate can be used. Instead of inorganic bases or salts, also organic bases are suitable such as pyridine, trimethylamine or triethylamine, N,N-di-isopropylethylamine, triethylamine or collidine. These, used in excess, can also serve as solvent. For the reaction with a carbamic or thiocarbamic acid chloride according to the invention, instead of 1-amino-2-oxa-adamantane an alkali metal salt thereof can be used such as the sodium potassium or lithium salt.

The conversion of a thiourea intermediate into a urea derivative can be performed, e.g. with the aid of an oxidising agent in acidic, alkaline or neutral medium. Suitable oxidising agents are, e.g. potassium ferricyanide, stannium-III-chloride, potassium permanganate, potassium chlorate, potassium hypochlorite or potassium hypoidite solution. Hydrogen peroxide or sodium peroxide in alkaline solution, e.g in sodium hydroxide solution, are particularly advantageous oxidising agents. In addition, the desulfurisation can also be performed with heavy metal compounds such as mercury oxide or lead oxide. These meal oxides are advantageously used in an aqueous organic solvent. Suitable organic solvents are, e.g. low alkanols such as methanol, alkane polyols such as glycol or glycerine, ether-type liquids such as tetrahydrofuran or dioxane, ketones such as acetone or methylethyl ketone, carboxylic acid amides such as N,N-dimethyl formamide and also urea derivatives such as 1,1,3,3-tetramethyl urea.

The transformation of a group R' of the intermediate reaction product into the amino group, by which process a compound of Formula I is formed, is performed by hydrolysis or reduction depending on the type of the group R'.

Groups R' which can be converted by hydrolysis into the free amino group are, e.g. acylamino groups such as the acetamido group, or alkoxy- or phenoxy- carbonylamino groups such as the ethoxycarbonylamino or phenoxycarbonylamino group. Other examples are substituted methylene amino groups such as the benzylidene amino group or the p-dimethylamino-benzylidene amino group. The hydrolysis to liberate the amino group can be performed in an acidic medium, e.g. by heating in dilute methanolic hydrochloric acid, or, when R' is an alkoxycarbonylamino or phenoxycarbonylamino radical, also under mild alkaline conditions, e.g. with 1 N to 2 N sodium hydroxide solution.

An example of a radical R' which can be converted by reduction into the amino group is the nitro group. The term reduction also includes reductive cleavage and examples of groups which can lead to the amino group in this way are the phenylazo or p-dimethylamino-phenylazo groups. In general, the reduction of these groups can be performed catalytically, e.g. with hydrogen in the presence of Raney nickel, palladium or platinum charcoal, in an inert solvent such as ethanol. In addition to catalytic processes, also other usual reduction processes can be used, e.g. the reduction of nitro groups or the reductive cleavage of azo groups with the aid of iron in acetic or hydrochloric acid.

The 1-amino-2-oxa-adamantane used as starting material can be produced, e.g. as follows; bicyclo[3,3,1]nonan-3,7-dione described in the literature [c.f. H. Stetter et al., Chem. Ber. 96, 694–698 (1963)] is reacted with benzylamine in tetrahydrofuran to form 3-benzylamino-2-oxa-adamantan-1-ol; the latter yields with lithium aluminium hydride in ether, 1-benzylamino-2-oxa-adamantane which is debenzylated with hydrogen in the presence of palladium charcoal.

One important embodiment of the present invention is the formation of pharmaceutically acceptable salts of compounds of Formula I with organic or inorganic bases.

Suitable pharmaceutically acceptable inorganic or organic salts are, e.g. alkali and alkaline earth salts, such as sodium, potassium, magnesium, and calcium salts, as well as ammonium salts, and salts with ethylamine, n-butylamine, triethylamine, choline, ethanolamine, diethanolamine, ethylene-diamine, benzylamine, dibenzylamine, pyrrolidine, piperidine, morpholine, N-ethyl-piperidine, 1-(2-hydroxyethyl)-piperidine, N-dimethyl-biguanide, N'-butyl-biguanide and N'-(2-phenylethyl)-biguanide; the three latter bases have a hypoglycemic action by themselves. Such salts are produced, e.g. by reacting the compound of Formula I with the equivalent amount of the desired base in a suitable solvent such as water, mixtures of water with an organic solvent or in organic solvents alone such as methanol, ethanol, diethylether, chloroform or methylene chloride and isolating the salts formed in a conventional manner.

The new compounds of the invention have been found to have valuable pharmacological properties, especially hypoglycemic activities combined with a very low order of toxicity. These favourable properties render the compounds of the invention well suited for the treatment of diabetes.

The hypoglycemic effects of the compounds of the invention are illustratively demonstrated in rats and rabbits. The test compound is administered orally to groups of 5 to 6 animals which have not been fed for 24 hours. Blood samples are taken from a vein of the animals and the blood sugar content is determined according to the method of Hagedorn-Jensen or with an autoanalyser. Thus it is shown that 1(phenylsulfonyl)-3-(2-oxa-adamant-1-yl)-urea, 1-(p-chlorophenylsulfonyl)-3-(2-oxa-adamant-l-urea and 1-(o-tolylsulfonyl)-3-(2-oxa-adamant-1-yl)-urea on oral administration in amounts of from 5 to 100 mg./kg. have an excellent hypoglycemic effect.

The compounds have a very lower order of toxicity on oral administration.

The new active substances or the pharmaceutically acceptable salts thereof are preferably administered orally. The daily dosages vary between 1 and 50 mg./kg. for mammals. Suitable dosage units such as dragees, tablets or gelatine capsules preferably contain 25–500 mg. of an active ingredient according to the invention, that is 20 to 80% of a compound of Formula I, or a pharmaceutically acceptable salt thereof with a base.

To produce dragees and tablets, the active substance is combined, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragees cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

The gelatine capsules mentioned preferably contain the active substance in the form of a granulate, e.g. in admixture with fillers such as maize starch and/or lubricants such as talcum or magnesium stearate and, optionally stabilisers such as sodium metabisulphite ($Na_2S_2O_5$) or ascorbic acid.

The following examples further illustrate the production of the new compounds of Formula I and of hitherto undescribed intermediate products, as well as the production of pharmaceutical compositions, but are by no means the sole methods of producing same. The temperatures are given in degrees centigrade.

Example 1

(a) A mixture of 21.8 g. of p-chlorophenylsulfonyl isocyanate and 15.0 g. of 1-amino-2-oxa-adamantane dissolved in 120 ml. of abs. toluene is refluxed for 2 hours and then concentrated to half its volume in vacuo. The precipitated crystals are filtered off under suction, washed with petroleum ether and dried in vacuo at 60°. The 1-(p-chlorophenyl-sulfonyl)-3-(2-oxa-adamant-1-yl)-urea obtained melts at 154–156°.

The starting compound, 1-amino-2-oxa-adamantane, is produced as follows:

(b) 7.60 g. (50 mM.) of bicylo[3,3,1]nonan-3,7-dione (produced according to H. Stetter et al., Chem. Ber. 96, 694–698 (1963)] and 5.35 g. (50 mM). of benzylamine are refluxed in 300 ml. of abs. tetrahydrofuran for 30 minutes. After cooling, this reaction mixture, which contains 3-benzylamino-2-oxa-adamantan-1-ol, is added dropwise, while stirring vigorously, to 3.80 g. (100 mM.) of lithium aluminum hydride in 100 ml. of abs. ether. The mixture is stirred for another 6 hours at a bath temperature of 40° whereupon, while cooling with ice, 19 ml. of 1 N sodium hydroxide solution are added dropwise. The precipitate formed is filtered off through Celite (registered trade name of Johns Manville Int. Corp., New York). The clear filtrate is evaporated. The residue is dissolved in 500 ml. of acetone and treated with 5 ml. of concentrated hydrochloric acid, whereupon the hydrochloride crystallises immediately. The 1-benzylamino-2-oxa-adamantane hydrochloride is filtered off, washed with cold acetone and dried for 6 hours under 12 torr. M.P. 242–245°.

(c) 9.30 g. (33 mM.) of 1-benzylamino-2-oxa-adamantane hydrochloride in 100 ml. of ethanol are hydrogenated in the presence of 2.0 g. of 5% palladium charcoal for 2 hours at 100° under a hydrogen pressure of 50 atm. After cooling, the catalyst is filtered off, the filtrate is concentrated, 25 ml. of concentrated sodium hydroxide solution are added to the residue which is then extracted with 200 ml. of ether. The ethereal solution is dried over potassium carbonate, concentrated and the residue is sublimated at 60° under 0.1 torr whereupon 1-amino-2-oxa-adamantane is obtained. The hydrochloride melts at 280°.

Example 2

The following end products are obtained analogously to Example 1 (a) starting from 15.3 g. of 1-amino-2-oxa-adamantane:

(a) with 19.1 g. of p-tolylsulfonyl isocyanate, 1(p-tolylsulfonyl)-3-(2-oxa-adamant-1-yl)-urea, M.P. 165–166°;
(b) with 18.3 g. of phenylsulfonyl isocyanate, 1-phenyl-sulfonyl-3-(2-oxa-adamant-1-yl)-urea hemihydrate, M.P. 128–129° (from methanol/water);
(c) with 20.1 g. of p-fluorophenylsulfonyl isocyanate, 1-(p-fluorophenylsulfonyl)-3-(2-oxa-adamant-1-yl)-urea, M.P. 183–184°, and
(d) with 21.7 g. of o-chlorophenylsulfonyl isocyanate, 1-(p-fluorophenylsulfonyl)-3-(2-oxa adamant-1-yl) urea.

Example 3

A mixture of 24.4 g. of (p-ethoxyphenylsulfonyl)-urea and 15.3 g. of 1-amino-2-oxa-adamantane in 600 ml. of abs. dioxane is stirred and refluxed for 2 hours. Ammonia is developed. The solution is then concentrated in vacuo and the residue is recrystallised from acetic acid ethyl ester whereupon pure 1-(p-ethoxyphenylsulfonyl)-3-(2-oxa-adamant-1-yl)-urea is obtained, M.P. 161–162°.

Example 4

The following end products are obtained analogously to Example 3 starting from 15.3 g. of 1-amino-2-oxa-adamantane:

(a) with 23.0 g. of (p-methoxyphenylsulfonyl)-urea, 1-(p-methoxy-phenylsulfonyl)-3-(2-oxa-adamant-1-yl)-urea;
(b) with 21.4 g. of sulfanilyl urea, 1-(sulfanilyl)-3-(2-oxa-adamant-1-yl)-urea methanolate, M.P. 138–140°;
(c) with 24.6 g. of (p-methylthio-phenylsulfonyl)-urea, 1-(p-methylthio-phenylsulfonyl) - 3 - (2-oxa-adamant-1-yl)-urea, M.P. 170–171°;
(d) with 27.9 g. of (p-bromophenylsulfonyl)-urea, 1-(p-bromophenylsulfonyl)-3-(2-oxa-adamant-1-yl)-urea;
(e) with 24.6 g. of (p-acetylphenylsulfonyl)-urea, 1-(p-acetylphenylsulfonyl)-3-(2-oxa-adamant-1-yl)urea;
(f) with 21.4 g. of (p-tolylsulfonyl)-urea, 1-(p-tolylsulfonyl)-3-(2-oxa-adamant-1-yl)-urea, M.P. 165–166°, according to its melting point and the mixed melting point, it is identical with the compound according to Example 2(a) and
(g) with 21.4 g. of (o-tolylsulfonyl)-urea, 1-(o-tolylsulfonyl)-3-(2-oxa-adamant-1-yl)-urea, M.P. 163–164°.

Example 5

A mixture of 24.3 g. of N-(p-tolylsulfonyl)-carbamic acid ethyl ester and 15.3 g. of 1-amino-2-oxa-adamantane in 400 ml. of abs. dioxane is refluxed for 3.5 hours. The solution is then evaporated to dryness in vacuo. The residue is recrystallised from benzene whereupon more 1-(p-tolylsulfonyl)-3-(2-oxa-adamant - 1 - yl)-urea is obtained. According to its melting point and the mixed melting point, it is identical with the compound obtained according to Example 2(a).

Example 6

The following end product is obtained analogously to Example 5 from 27.3 g. of N-(p-ethoxyphenylsulfonyl)-carbamic acid ethyl ester and 15.3 g. of 1-amino-2-oxa-adamantane. 1-(p-ethoxyphenylsulfonyl) - 3 - (2-oxa-adamant-1-yl)-urea, M.P. 161–162°. According to its melting point and the mixed melting point, it is identical with the compound obtained according to Example 3.

Example 7

A solution of 15.3 g. of 1-amino-2-oxa-adamantane in 200 ml. of dioxane is added to 24.3 g. of N-(o-tolylsulfonyl)-carbamic acid ethyl ester dissolved in 600 ml. of dioxane. The salt of both reaction components precipitates in the form of a thick crystal slurry. The reaction mixture is boiled whereupon a clear solution is formed. The ethanol liberated is continuously distilled off. After boiling for 2.5 hours, the reaction mixture is evaporated in vacuo. The residue is recrystallised from acetic acid ethyl ester whereupon 1-(o-tolylsulfonyl)-3-(2-oxa-adamant-1-yl)-urea, M.P. 163–164°, is obtained. According to its melting point and the mixed melting point, the compound obtained is identical with the end product of Example 4(g).

Example 8

A mixture of 15.3 g. of 1-amino-2-oxa-adamantane and 25.6 g. of 1-acetyl-3-(p-tolylsulfonyl)-urea in 500 ml.

of abs. dioxane is stirred and refluxed for 1 hour. The reaction mixture is concentrated in vacuo and water is added. The precipitated crystals are filtered off under suction, washed with water and recrystallised from dilute methanol. 1-(p-tolylsulfonyl) - 3 - (2-oxa-adamant-1-yl)-urea is obtained which melts at 165–166°. According to the melting point and the mixed melting point, it is identical with the compound obtained according to Example 2(a).

Example 9

A mixture of 15.3 g. of 1-amino-2-oxa-adamantane and 28.2 of N-(p-tolylsulfonyl)-2 - oxo - pyrrolidine - 1 - carboxamide (M.P. 145–147°) in 500 ml. of abs. dioxane is refluxed for 30 minutes. The reaction mixture is then evaporated in vacuo and water is added to the residue. The crystalline crude product is filtered off under suction, washed with water, dried in vacuo at 60° and recrystallised from dilute methanol. Pure 1-(p-tolylsulfonyl)-3-(2-oxa-adamant - 1 - yl) - urea is obtained, M.P. 165–166°. It is identical with the compound obtained according to Example 2(a).

Example 10

The following end products are obtained analogously to Example 9 starting from 15.3 g. of 1-amino-2-oxa-adamantane:

(a) with 33.1 g. of N-(p-chlorophenylsulfonyl)-2-oxo-hexahydro-1H-azepine-1-carboxamide, 1 - (p - chlorophenylsulfonyl)-3-(2-oxa-adamant - 1 - yl) - urea, M.P. 154–156° which, according to its melting point and mixed melting point, is identical with the compound obtained according to Example 1(a), and (b) with 29.6 g. of N-phenylsulfonyl-2-oxo-hexahydro-1H-azepine-1-carboxamide. M.P. 107–108.5°, 1-phenylsulfonyl-3-(2-oxa-adamant - 1 - yl) - urea hemihydrate M.P. 129° (from methanol/water) which, according to its melting point and mixed melting point, is identical with the compound of Example 2(b).

Example 11

1-(p-tolylsulfonyl)-3-(2-oxa-adamant-1-yl) - thiourea, M.P. 190–191°, is obtained analogously to Example 1(a) from 21.3 g. of p-tolylsulfonyl isothiocyanate and 15.3 g. of 1-amino-2-oxa-adamantane in 50 ml. of abs. toluene. The thiourea obtained is dissolved in 100 ml. of 2 N sodium hydroxide solution and 30% hydrogen peroxide is added. An exothermic reaction occurs. After completion the reaction mixture is heated for half an hour at 80° whereupon it is cooled and the solution is poured into 2 N hydrochloric acid while stirring. The crude product is filtered off under suction, washed with water, dried in vacuo at 60°. The 1-(p-tolylsulfonyl)-3-(2-oxa-adamant-1-yl)-urea obtained melts at 165–166°. According to the melting point and the mixed melting point, the pure compound is identical with the compound obtained according to Example 2(a).

Example 12

A solution of 15.3 g. of 1-amino-2-oxa-adamantane in 200 ml. of dioxan is added to a solution of 22.8 g. of p-nitrophenylsulfonyl isocyanate in 200 ml. of abs. dioxan. After the exothermic reaction is completed 5 g. of 5% palladium/charcoal is added whereupon the reaction mixture is hydrogenated at 20° under normal pressure until the calculated amount of hydrogen is taken up. The catalyst is filtered off and washed with dioxan. The filtrate is evaporated in vacuo and the residue recrystallised from methanol to give 1-(sulfanilyl)-3-(2-oxa-adamant-1-yl)-urea methanolate, M.P. 138–140°.

Example 13

A mixture of 23.4 g. of p-tolylsulfonylcarbamic acid chloride (GB 935 980) and 31 g. of 1-amino-2-oxa-admantane in 400 ml of abs. toluene is refluxed for two hours. The cooled reaction mixture is extracted with three times 50 ml. of water. The toluene solution is dried with sodium sulfate and evaporated. The residue is recrystallized from benzene-petroleum ether to give 1-(p-tolylsulfonyl)-3-(2-oxa-adamant-1-yl)-urea, M.P. 165–166°.

Example 14

A mixture of 25.6 g. of p-acetamidophenylsulfonyl urea and 15.3 g. of 1-amino-2-oxa-adamantan in 500 ml. of dioxan is stirred and refluxed until development of ammonia ceases. The reaction mixture is treated with 100 ml. of a 10% sodium hydroxide solution, refluxed for two more hours and evaporated in vacuo. The residue is dissolved in water, filtered through charcoal and neutralized with acetic acid. The precipitate is filtered off and recrystallized from methanol to give 1-(sulfanilyl)-3-(2-oxa-adamant-1-yl)-urea methanolate. M.P. 138–140°.

Example 15

To a hot solution of 37.1 g. of 1-(p-chlorophenylsulfonyl)-3-(2-oxa-adamant-1-yl)-urea in 100 ml. of hot ethanol is added 22 ml. of 5 N sodium hydroxide. The sodium salt of 1-(p-chlorophenylsulfonyl)-3-(2-oxa-adamant-1-yl)-urea on cooling crystallises. It is filtered off, washed with ethanol and dried. M.P. over 250°.

Example 16

To a solution of 37.1 g. of 1-(p-chlorophenylsulfonyl)-3-(2-oxa-adamant-1-yl)-urea in 100 ml. of hot ethanol is added 7.3 g. of n-butylamine. The solution is cooled and petroleum ether is added until crystallisation begins. The crystals are filtered off and washed with petroleum ether. The n-butylamine salt of 1-(p-chlorophenylfonyl)-3-(2-oxa-adamant-1-yl)-urea prepared in this way has a melting point of 115–120°.

Example 17

A mixture of 1000 g. of 1-(p-chlorophenylsulfonyl)-3-(2-oxa-adamant-1-yl)-urea, 550 g. of lactose and 292 g. of potato starch is moistened with an aqueous solution of 8.0 g. of gelatine and granulated through a sieve. After drying, 60.0 g. of potato starch 60.0 g. of talcum, 10.0 g. of magnesium stearate and 20.0 g. of colloidal silicon dioxide are mixed in and the mixture is pressed into 10,000 tablets each weighing 200 mg. and containing 1000 mg. of active substance. If desired, the tablets can be grooved for better adaptation of the dosage.

Example 18

A granulate is produced from 1000 g. of 1-(p-tolylsulfonyl)-3-(2-oxaadamant-1-yl)-urea, 379.0 g. of lactose and the aqueous solution of 6.0 g. of gelatine. After drying, the granulate is mixed with 10.0 g. of colloidal silicon dioxide, 40.0 g. of talcum, 60.0 g. of potato starch and 5.0 g. of magnesium stearate and the mixture is pressed into 10,000 dragee cores. These are then coated with a concentrated syrup made from 533.5 g. of crystallised saccharose, 20.0 g. of shellac, 75.0 g. of gum arabic, 250 g. of talcum, 20 g. of colloidal silicon dioxide and 1.5 g. of dyestuff and dried. The dragees obtained each weigh 240 mg. and contain 100 mg. of active substance.

What is claimed is:

1. A compound of the formula

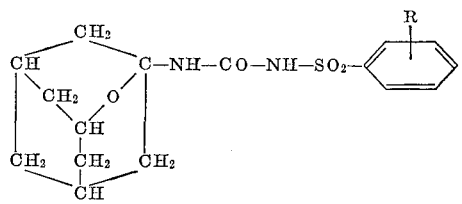

wherein R is hydrogen, fluoro, chloro, bromo, (lower) alkyl, (lower)alkoxy, (lower)alkylthio, (lower)alkanoyl, or amino.

2. The pharmaceutically acceptable salt of a compound as defined in claim 1 with a base.

3. A compound as defined in claim 1 wherein R is hydrogen and the pharmaceuticaly acceptable salt of said compound with a base.

4. A compound as defined in claim 1 wherein R is p-chloro and the pharmaceutically acceptable salt of said compound with a base.

5. A compound as defined in claim 1 wherein R is p-methyl and the pharmaceutically acceptable salt of said compound with a base.

6. A compound as defined in claim 1 wherein R is o-methyl and the pharmaceutically acceptable salt of said compound with a base.

References Cited

Stetter et al.: Chemische Berichte, vol. 99, pp. 1435–8 (1966).

Gagneux et al.: Chemical Abstracts, vol. 67, entry 108325g (1967).

JOHN D. RANDOLPH, Primary Examiner

J. M. FORD, Assistant Examiner

U.S. Cl. X.R.

260—239.6, 513.5, 518, 543, 453, 454, 552, 553, 471, 326.3, 293.4, 239.3, 345.9, 345.1, 247.1, 999